G. M. TURNER.
TRUCK.
APPLICATION FILED APR. 12, 1919.
1,434,572.
Patented Nov. 7, 1922.
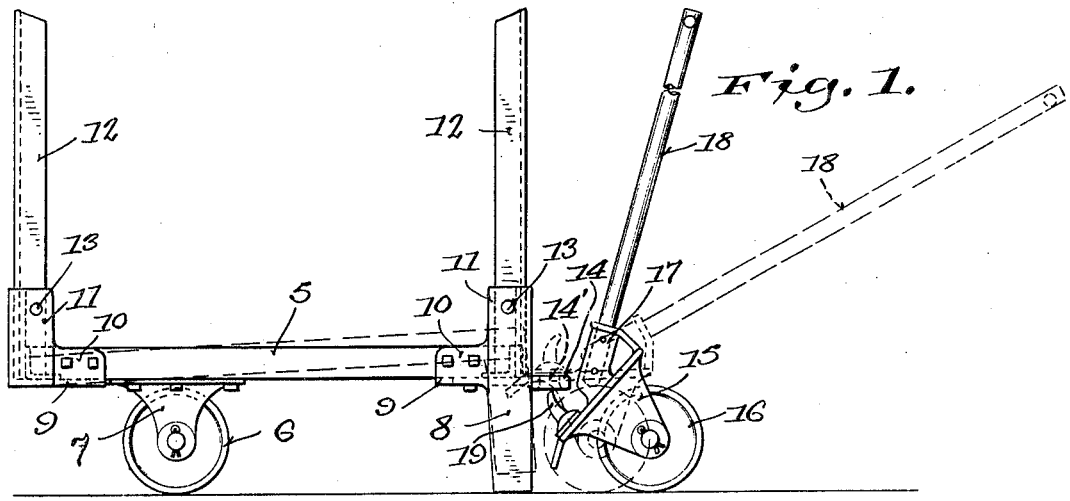
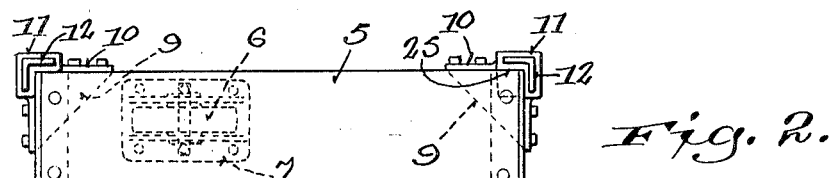
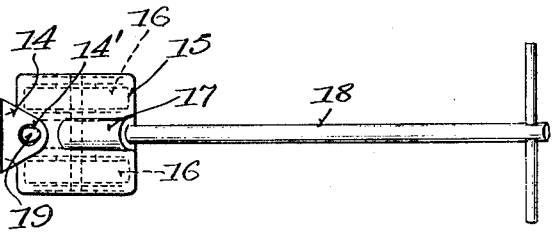
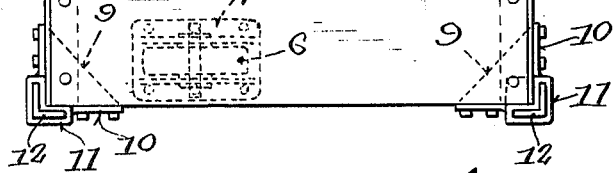
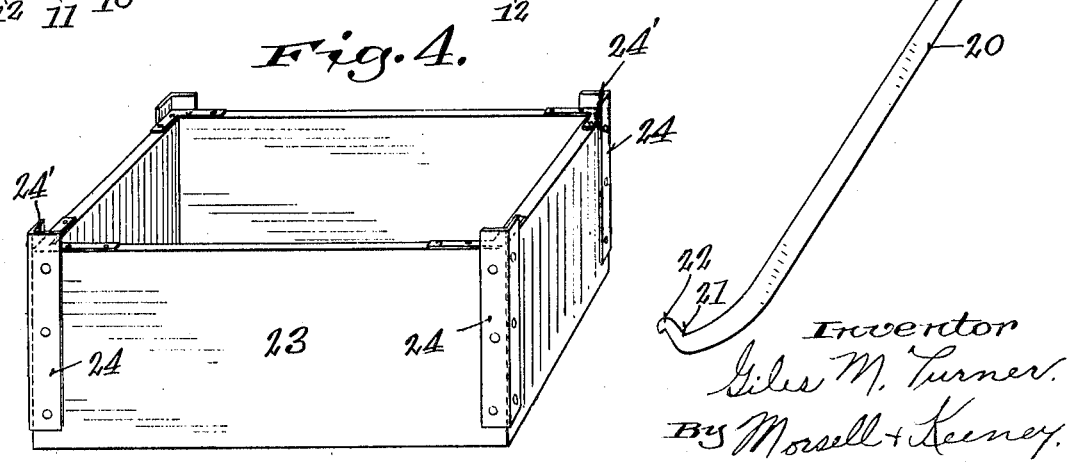
Inventor
Giles M. Turner.
By Morsell + Keeney,
Attorneys.

Patented Nov. 7, 1922.

1,434,572

UNITED STATES PATENT OFFICE.

GILES M. TURNER, OF MILWAUKEE, WISCONSIN.

TRUCK.

Application filed April 12, 1919. Serial No. 289,603.

*To all whom it may concern:*

Be it known that I, GILES M. TURNER, a citizen of the United States, and resident of Milwaukee, in the county of Milwaukee and State of Wisconsin, have invented new and useful Improvements in Trucks, of which the following is a description, reference being had to the accompanying drawings, which are a part of this specification.

The object of the present invention is to provide a truck, the carrier or main body of which is so constructed that the same may be readily adapted to haul work material of various kinds.

A further object of this invention is to provide a truck having a readily operable guide wheel and handle, forming a jack truck, and a main body or carrier having a jack truck receiving bracket or coupling.

A still further object is to provide a truck body having corner members capable of receiving load-retaining means of various constructions to adapt the truck for use to either haul or store materials of any desired character.

With the above and other objects in view, which will appear as the description proceeds, the present invention resides in the novel construction, combination and arrangement of parts substantially as hereinafter described, and more particularly defined by the appended claims, it being understood that such changes in the precise embodiment of the herein disclosed invention may be made as come within the scope of the claims.

In the accompanying drawing, I have illustrated one complete example of the physical embodiment of my invention constructed according to the best mode I have so far devised for the practical application of the principles thereof, and in which:

Fig. 1 is a view of the side elevation, the jack truck being shown in full lines as it is being engaged with its coupling bracket, and in dotted lines as it is when engaged therewith;

Fig. 2 is a plan view of my invention.

Fig. 3 is a detailed view of a form of handle which may be employed in place of the jack truck; and Fig. 4 is a perspective view of a four-sided receptacle adapted to be placed upon the carrier or main body.

Referring now more particularly to the drawings, 5 designates the main body or carrier on which the load is to be carried, said body being supported by suitable carrying wheels 6—6, journalled in the rear trucks 7, to which the body 5 is attached. At each corner of the end of body 5, opposite wheels 6, a supporting leg 8 is provided, to assist the wheels 6 in supporting the carrier.

The supports or legs 8 are formed integral with the corner bracket members 9 which are secured to the forward corners of the carrier 5 and have upwardly extending flanges 10 formed thereon to reinforce the corners of the truck. The corner brackets thus formed have extending upwardly therefrom a right angular socket member 11, adapted to receive the right angular upright 12, which are detachably secured therein by means of suitable dowel pins 13. The rear corners of the carrier 5 have secured thereto bracket members which are identical with those just described, except for the depending leg members or supports 8, and the description of the forward brackets will suffice for the rear brackets.

Centrally secured to the forward end of the carrier 5 is a coupling bracket or arm 14, which is provided near its end with an eye 14' which is preferably rounded out top and bottom for the reception of the coupling pin of the jack truck, as well be hereinafter described. The jack truck, which is designed to cooperate with the structure thus far described, comprises a main bifurcated body 15, between the legs of which is journaled a caster wheel 16. The body 15 is provided with a socket 17 which receives a handle bar 18. At its top is an upwardly and forwardly projecting pin 19 which is circular in horizontal cross section at its middle and uniformly flared outwardly at its base, so as to fit, with slight play, the lower end of the perforation 14', the arrangement being such that the finger 19 may be hooked upwardly to the perforation 14' and the wheel 16 thus made to support the forward end of the carrier as depicted by dotted lines in Fig. 2.

In place of the jack truck just described, a handle 20, as illustrated in Fig. 3, may be employed to move the carrier from place to place, having a laterally turned end 21 for engagement in the opening of the eye 14', a lug 22 on the free end of the laterally turned end contacting with the portion of the bracket adjacent the opening therein. This construction is adapted for use in moving the carrier when the same is empty or has only a light load thereon.

When it is desired to carry small material on the carrier, a four-walled box-like receptable 23 is provided, as depicted in Fig. 4, which has its corners reinforced by means of angular braces 24, the upper ends of which project slightly above the top of the receptacle for the purposes herein described. When this receptacle is employed, the angular uprights 12 may or may not be removed from their sockets, and the receptable is placed on the carrier and confined between the inner right angular faces 25 of the sockets 11, as will be readily understood.

When it is desired to increase the depth of the receptacles 23, one or more like receptacles may be placed thereon, with the lower edge resting on the top edge of the lowermost receptacle and being confined between the upwardly projecting ends 24' of the right angular braces 24. In place of the form of receptacle depicted in Fig. 4, a series of tray-shaped members or tote boxes may be placed on the carrier 5, superimposed one over the other, such trays being retained in position by means of end corners engaging the right angular supports 12, or in any special frame carried by the brackets.

What I claim as my invention is:

1. In a device of the class described, comprising a carrier having a body portion of rectangular form, socket members mounted on the side edge portions of said body and formed with vertically extending angular portions and openings, the socket members at the front portion of the body extending downwardly to form legs, and upright parts angular in cross-section extending into said sockets to increase the holding capacity of said body.

2. In a device of the class described, comprising a carrier having a body portion of rectangular form, socket members mounted on the side edge portions of said body and formed with vertically extending angular portions and openings, the socket members at the front portion of the body extending downwardly to form legs, and a box like member having angular upright corner portions which project above the said member, the lower portion of said box like member adapted to fit into the vertically extending corner portions of the body portion to increase the holding capacity of said body.

In testimony whereof, I affix my signature.

GILES M. TURNER.